United States Patent [19]

Molaug et al.

[11] 4,359,014

[45] Nov. 16, 1982

[54] FOOD DISPENSING SYSTEM

[76] Inventors: Ole Molaug, Tytebaerholen 30, N-4340 Byrne; Gunnar Kluge; Sveinung Havrevold, both of N-4344 Kvernaland, all of Norway

[21] Appl. No.: 266,505

[22] Filed: May 22, 1981

[51] Int. Cl.³ ............................................. A01K 61/02
[52] U.S. Cl. .................................................. 119/51 R
[58] Field of Search ................. 119/3, 5, 51 R, 51.11, 119/52 AF

[56] References Cited

U.S. PATENT DOCUMENTS

| | | | |
|---|---|---|---|
| 2,858,799 | 11/1958 | Krauss et al. | 119/51.11 X |
| 3,113,556 | 12/1963 | Jarvis | 119/51.11 |
| 3,171,385 | 3/1965 | Decker et al. | 119/51.11 |
| 3,234,910 | 2/1966 | Moloney | 119/51.11 |
| 3,494,331 | 2/1970 | Eckert | 119/51.11 |
| 3,526,210 | 9/1970 | Burton | 119/51 R |
| 3,720,185 | 3/1973 | Aldous et al. | 119/51.11 |
| 3,918,405 | 11/1975 | Hostetler | 119/52 AF |
| 4,029,052 | 6/1977 | Launder | 119/52 AF |
| 4,203,389 | 5/1980 | Gasper, Jr. et al. | 119/3 |

FOREIGN PATENT DOCUMENTS

| | | | |
|---|---|---|---|
| 2421626 | 11/1975 | Fed. Rep. of Germany | 119/51 R |
| 115689 | 2/1969 | Norway . | |
| 648184 | 2/1979 | U.S.S.R. | 119/51 R |

*Primary Examiner*—Gene Mancene
*Assistant Examiner*—Robert P. Swiatek
*Attorney, Agent, or Firm*—Schwartz, Jeffery, Schwaab, Mack, Blumenthal & Koch

[57] ABSTRACT

The system produces signals indicative of the oxygen content of water within a plurality of tanks. Based thereon, a required food amount is calculated in a control unit. The control unit causes food to be released from storage silos. The food is weighed and passed through a distribution device to the tanks. The control unit receives a signal indicative of the food weight and controls the distribution device based thereon to ensure that the proper amount of food is passed to the appropriate tank.

9 Claims, 4 Drawing Figures

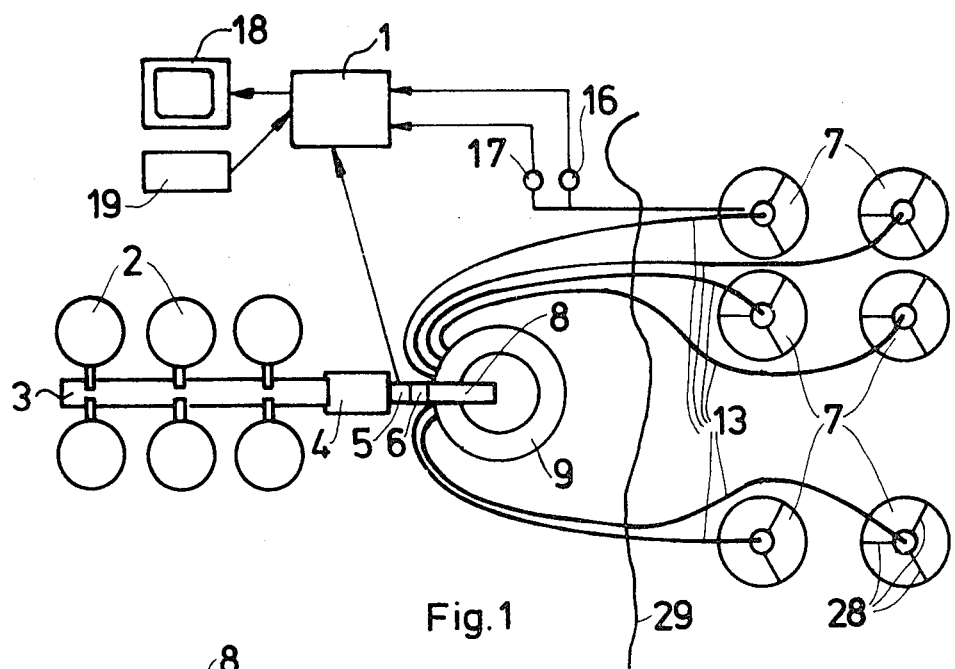
Fig. 1
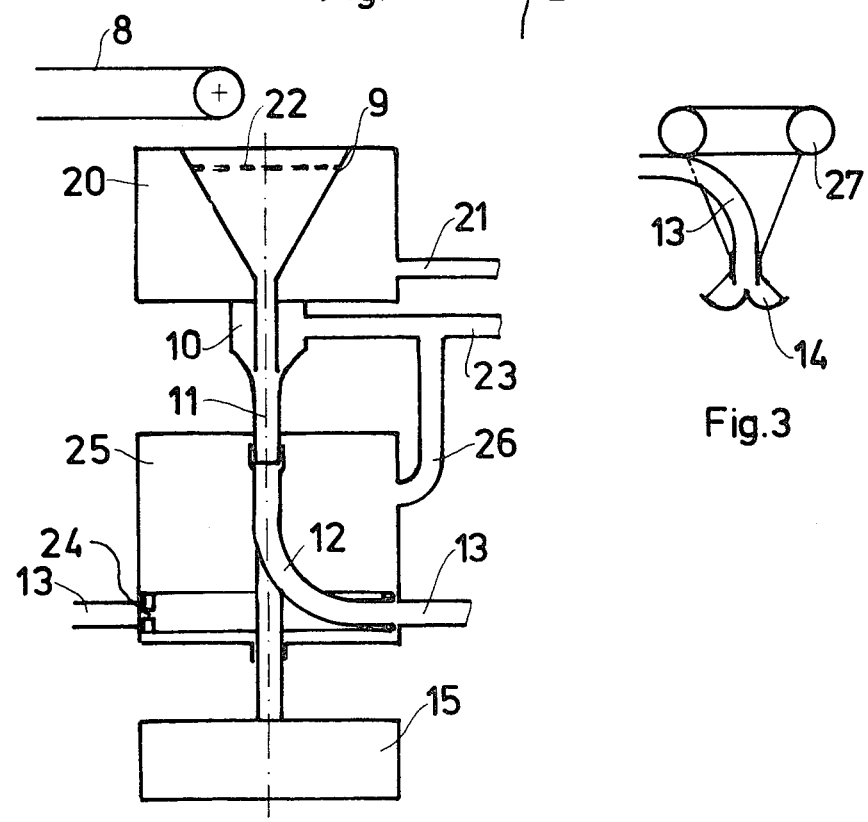
Fig. 2
Fig. 3

FOOD DISPENSING SYSTEM

BACKGROUND OF THE INVENTION

The present invention relates to a system for automatic control, distribution and conveyance of food pellets from one or more food supply silos to fish within one or more pools or tanks.

In one common manner of feeding, food for the fish is loaded on a boat or a cart and carried to the different tanks, to be subsequently spread in appropriate amounts into the tanks. Feeding is usually accomplished twice a day.

According to another well-known procedure, the food is held in an automatically operated feeding silo mounted on a buoy over each tank. Each feeding silo is provided with a dispensing device comprising an electrically operated vibrator or screw conveyor which is controlled by a timer and a cooperating photoelectric cell.

These known methods have proved laborious and rather inefficient.

It is an object of the present invention to provide a system for control, distribution and conveyance of food pellets from a single or a plurality of food supply tanks to fish kept in one or more pools or tanks, wherein the disadvantages of the well-known feeding methods are obviated.

Another object of the present invention is to provide a system for control, distribution and conveyance of food pellets which can automatically determine required food amounts and distribute these required amounts to the appropriate tanks.

In accordance with these and other objects, the present invention comprises a sensing means for producing signals indicative of conditions within the tanks. The signals contain information from which the oxygen content of the tanks can be calculated. A control means receives the signals, calculates the amount of food required by each tank and outputs command signals indicative thereof. Storage means hold the food and release amounts of it in response to the command signals. The released food is passed to a weighing means which produces a signal indicative of the weight thereof. This signal is passed to the control means which produces a distribution signal indicative of the tanks to which the food is to be passed. A distribution means acts in response to the distribution signal to channel the food to the appropriate tanks.

BRIEF DESCRIPTION OF THE DRAWINGS

Reference is had to the accompanying drawings, wherein:

FIG. 1 is a schematic plan view of a feeding system of the present invention;

FIG. 2 is an enlarged side elevational view showing a portion of the system of FIG. 1;

FIG. 3 is a further enlarged side elevational view showing another portion of the system of FIG. 1.

DETAILED DESCRIPTION OF THE PREFERRED EMBODIMENTS

Figure 4:
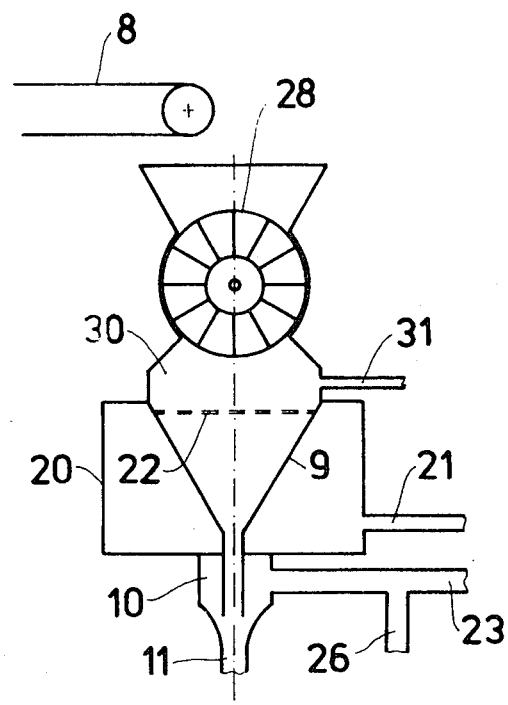
FIG. 4 is a side elevational view of an alternative form of a portion of the system depicted in FIG. 2.

Referring to the drawings, and particularly to FIG. 1, numeral 1 indicates a control unit which may be a microprocessor for selective actuation of any one of a plurality of food supply silos 2. By means of a conveyor belt 3, food in the form of pellets is carried from actuated supply silos 2 to a sieve 4 wherein dust and dirt mixed with the pellets are removed. A conveyor belt 5 receives the food from sieve 4 and transfers it onto an integral weighing device 6. Weighing device 6 measures amounts of food being passed. This information is transmitted from weighing device 6 to the control unit 1. Control unit 1 performs calculations and controls distribution of the proper amount of food to the appropriate tank 7, based on the information received from weighing device 6.

The food is forwarded on a conveyor belt 8 to a funnel shaped hopper 9. As shown in FIGS. 1 and 2, hopper 9 opens into an injector 10 which has an outlet 11 connected to a selector valve 12. Selector valve 12 is adapted to communicate with a plurality of discrete pipe conduits 13 arranged to conduct the food to a spreader 14 (FIG. 3) in each tank 7. The selector valve 12 is brought into the proper selected position for the appropriate tank 7 to be supplied with food by means of an index device 15 which is electrically operated by the control unit 1. Selector valve 12 is a curved tube. Index device 15 rotates the selector valve until it comes into registration with the appropriate conduit 13 which leads to the desired tank 7.

The specific gravity and temperature of the water in each of the plurality of tanks 7 are measured by sensing devices 16, 17. Sensing devices 16, 17 are connected to control unit 1 which is adapted to determine the oxygen content of the water based on the specific gravity and temperature measured. This determination is utilized for automatic calculation of the appropriate amount of food to be dispensed into each tank 7.

Control unit 1 is also capable of calculating varying food quantities required based on predetermined feeding augmentation schedules. For this purpose control unit 1 contains a clock for keeping track of the time of day as well as yearly time periods. Based on this information, control unit 1 establishes feeding periods which may vary, for example, month by month or week by week. Also, control unit 1 stores information concerning the state of the system which can be displayed by means of an indicator screen 18 and a keyboard 19.

Hopper 9 is enclosed by a water-filled container 20, the water being supplied through a conduit 21. The upper part of hopper 9 is provided with a plurality of circumferentially spaced openings 22 through which water enters the hopper from container 20. Openings 22 are angled to cause a rotary and screwing motion of the water as it passes downward through hopper 9. In this manner the water forms a film on the inner surface of the hopper 9. The film protects pellets passing into the inlet of injector 10. Injector 10 receives a stream of water rotating in the same direction as the water within hopper 9 through a pipe 23 to aid in moving pellets through the injector, valve 12 and conduit 13 which is connected to the valve.

Each of the conduits 13 which is not coupled to selector valve 12 at a particular time receives water through a nozzle 24. The flow of water is continuous, to make certain that all of the food previously passed into the conduits is flushed into tanks 7 and to prevent water from freezing within the conduits 13. Selector valve 12 is surrounded by water-filled container 25. Container 25 receives water through pipe 26 and acts as a source of water for nozzles 24.

As seen in FIGS. 1 and 3, each of the spreaders 14 is mounted on a float 27. Each float 27 is held in position in the center of a tank 7 by means of three lines 28. Accordingly, the food passed into each tank will be more evenly distributed about the tank.

Tanks 7 and the associated floats 27, lines 28 and spreaders 14 are positioned in a lake, sea or the like. They are held in sufficiently deep water away from shoreline 29 by an appropriate means, such as anchors, cables, etc. The system of the present invention is preferably positioned on land and communicates with tanks 7 by conduits 13. Electrical leads for metering devices 16, 17 may be attached to conduits 13.

An alternative mechanism for facilitating passing pellets through hopper 9 is shown in FIG. 4. In FIG. 4, it will be seen that food pellets delivered on conveyor 8 fall into sluicing wheel 28. Wheel 28 is disposed within a housing which sealingly engages hopper 9 to form an airtight chamber 30. Chamber 30 is positively pressurized by air passing through conduit 31. The positive pressure in chamber 30 aids in forcing pellets through the hopper 9. The pellets enter chamber 30 through wheel 28. The pellets enter individual radial openings formed circumferentially of the wheel and are carried into chamber 30 as the wheel rotates. By the use of wheel 28, the pellets can enter chamber 30 without reducing the pressure therein.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed:

1. A system for automatic feeding of fish within a plurality of tanks, comprising:
   (a) sensing means for producing signals indicative of conditions in said tanks;
   (b) control means for receiving said signals and calculating command signals indicative of food amounts required for said tanks;
   (c) storage means for holding a supply of food, said storage means being responsive to said command signals for releasing amounts of said food;
   (d) weighing means for producing a signal indicative of the weight of said released food;
   (e) said control means being responsive to said weight signal for producing a distribution signal; and
   (f) distribution means responsive to said distribution signal for distributing said released food to said tanks, said distribution means comprising conduits extending to respective ones of said tanks; an inlet means for receiving said released food; and selector valve means for selectively connecting said inlet means to individual ones of said conduits in response to said distribution signal.

2. The system as set forth in claim 1 wherein said inlet means comprises a funnel shaped hopper to channel said released food to said selector valve means; and flow means for producing a downward rotary flow of liquid in said hopper to carry said food through said hopper.

3. The system as set forth in claim 2 and further wherein said inlet means comprises an injector means positioned below said hopper for injecting water into said selector valve means with a rotary flow in the same direction as produced by said flow means.

4. The system as set forth in claim 1 wherein said sensing means signals contain information related to the quantity of oxygen in said tanks.

5. The system as set forth in claim 1 wherein said distribution means further comprises spreader means connected to said conduits for spreading said food about said tanks.

6. The system as set forth in claim 5 and further wherein said distribution means comprises float means connected to said spreader means for holding said spreader means at the top of each tank.

7. The system as set forth in claim 1 and further including pressure feed means for forcing said food through said inlet means, said pressure feed means including a housing positioned above said inlet means and a source of pressure connected to said housing.

8. The system as set forth in claim 7 wherein said pressure feed means further includes a rotary feed wheel having a plurality of radial openings for receiving said released food and conveying said released food into said housing.

9. The system as set forth in claim 1 and further including nozzle means for forcing water through conduits not connected to said inlet means by said selector means to flush food therefrom.

* * * * *